US012625231B2

(12) United States Patent
Lavery et al.

(10) Patent No.: US 12,625,231 B2
(45) Date of Patent: May 12, 2026

(54) REDUCED LATENCY LOOK-AHEAD FOR SIGNAL DETECTOR

(71) Applicant: BAE SYSTEMS Information and Electronic Systems Integration Inc., Nashua, NH (US)

(72) Inventors: Richard J. Lavery, Huntington, NY (US); Peter Ladubec, Jr., Centereach, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 281 days.

(21) Appl. No.: 18/535,177

(22) Filed: Dec. 11, 2023

(65) Prior Publication Data

US 2025/0189625 A1 Jun. 12, 2025

(51) Int. Cl.
*G01S 7/292* (2006.01)

(52) U.S. Cl.
CPC .................................. *G01S 7/2922* (2013.01)

(58) Field of Classification Search
CPC ......... G01S 7/02; G01S 7/2922; H04B 1/001; H04B 1/0021; H04B 1/1027
USPC ........................................................ 342/175
See application file for complete search history.

(56) References Cited

U.S. PATENT DOCUMENTS

| | | | | |
|---|---|---|---|---|
| 4,972,430 A | * | 11/1990 | Cantwell | ................. H04K 3/228 375/345 |
| 5,051,981 A | | 9/1991 | Kline | |

| | | | | |
|---|---|---|---|---|
| 6,888,879 B1 | | 5/2005 | Lennen | |
| 7,336,219 B1 | * | 2/2008 | Lohmeier | ............. G01S 13/931 342/21 |
| 7,688,923 B2 | | 3/2010 | Capretta | |
| 7,702,291 B2 | * | 4/2010 | Hansen | ................... G01S 7/021 455/442 |
| 7,791,526 B2 | * | 9/2010 | Gounalis | ............... H04W 48/16 342/13 |

(Continued)

FOREIGN PATENT DOCUMENTS

WO WO2023107654 A1 6/2023

OTHER PUBLICATIONS

Christian Wolff "Monopulse Antenna" https://www.radartutorial.eu/06.antennas/Monopulse%20Antenna.en.html ; printed from the website of Dec. 8, 2023 (3 pages).

*Primary Examiner* — Brady W Frazier
(74) *Attorney, Agent, or Firm* — Gary McFaline

(57) ABSTRACT

Techniques are provided for reduced latency look-ahead for signal detection. An example methodology implementing the techniques according to an embodiment includes down converting a digitized signal to a first baseband signal at a first decimation rate such that the first baseband signal is provided at a first latency with a first signal to noise ratio (SNR) based on the first decimation rate. The method also includes down converting the digitized signal to a second baseband signal at a second decimation rate, greater than the first decimation rate, such that the second baseband signal is provided at a second latency with a second SNR based on the second decimation rate, the second latency greater than the first latency and the second SNR greater than the first SNR. The method continues with generating a detection threshold based on the first baseband signal prior to completion of the second baseband signal generation.

17 Claims, 6 Drawing Sheets

(56) References Cited

U.S. PATENT DOCUMENTS

| | | | |
|---|---|---|---|
| 7,912,158 B2 | 3/2011 | Cahn et al. | |
| 8,589,461 B1 | 11/2013 | Souza et al. | |
| 8,693,581 B2 | 4/2014 | Kim et al. | |
| 8,908,607 B2 * | 12/2014 | Kummetz | H04B 1/001 |
| | | | 370/328 |
| 8,949,302 B2 | 2/2015 | Elenes | |
| 9,014,307 B2 | 4/2015 | Seely | |
| 9,065,487 B2 | 6/2015 | Wichern | |
| 9,294,135 B2 | 3/2016 | Eo et al. | |
| 9,398,587 B1 * | 7/2016 | Kong | H04W 72/044 |
| 9,954,633 B2 | 4/2018 | Pralea | |
| 9,979,449 B2 | 5/2018 | Ram et al. | |
| 10,142,031 B2 | 11/2018 | Charlet et al. | |
| 10,725,151 B1 | 7/2020 | Ray | |
| 11,050,435 B1 | 6/2021 | Poulsen | |
| 11,329,678 B2 | 5/2022 | Bury | |
| 11,592,523 B2 * | 2/2023 | Schubert | G01S 13/5246 |
| 2005/0059363 A1 * | 3/2005 | Hansen | G01S 7/021 |
| | | | 455/73 |
| 2007/0189505 A1 | 8/2007 | Dyba et al. | |
| 2009/0135972 A1 * | 5/2009 | Tanaka | H04B 1/1027 |
| | | | 375/346 |
| 2010/0093301 A1 | 4/2010 | Lee et al. | |
| 2014/0119281 A1 * | 5/2014 | Kummetz | H04W 72/23 |
| | | | 370/328 |
| 2018/0048500 A1 | 2/2018 | Tanaka | |
| 2018/0091179 A1 * | 3/2018 | Sanderovich | H04B 1/1027 |
| 2021/0373143 A1 * | 12/2021 | Beaudin | G01S 7/2927 |
| 2022/0210731 A1 * | 6/2022 | Friedman | H04B 17/318 |

* cited by examiner

Antenna
110

RF in
120

Receiver
130

Detector with Reduced
Latency Look-Ahead
140

REDUCED LATENCY LOOK-AHEAD FOR SIGNAL DETECTOR

STATEMENT OF GOVERNMENT INTEREST

This invention was made with United States Government assistance under Contract No. FA8232-17-D-0027/FA8232-21-F-0286. The United States Government has certain rights in this invention.

FIELD OF DISCLOSURE

The present disclosure relates to signal detection, and more particularly to reduced latency look-ahead for a signal detection system.

BACKGROUND

Radar systems often have requirements for relatively rapid response times after detection of a signal of interest. For example, the time required to detect a signal and act upon that detection may be constrained based on operational requirements. Additionally, such systems may have requirements to detect signals at relatively low power levels. Meeting both sets of requirements simultaneously can be challenging.

Figure 1:
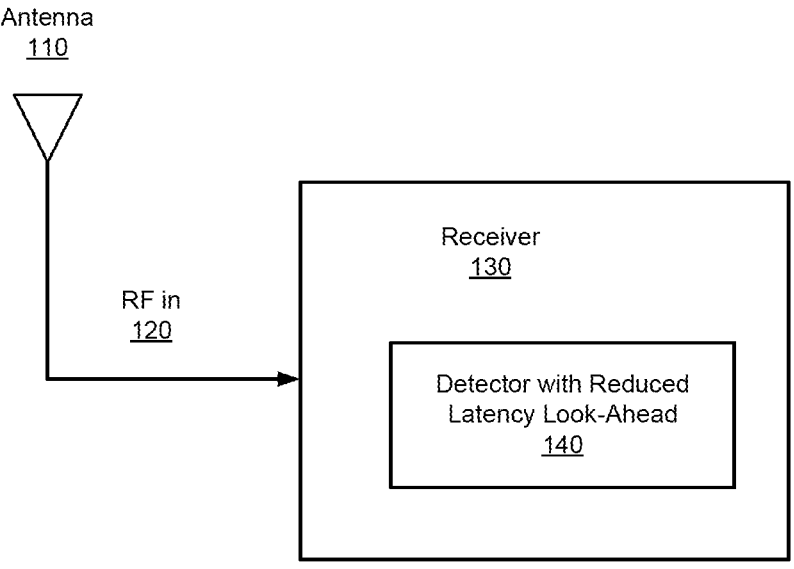
FIG. 1 illustrates a radar system including a detector with reduced latency look-ahead, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for a signal detector with reduced latency look-ahead capability. The techniques are particularly useful in the context of a radar system, but can be used in other applications that can benefit from reduced latency look-ahead capability. As noted above, simultaneously meeting the requirements for both rapid response to signal detection and the ability to detect signals at relatively low power levels can be challenging for a given signal detection system.

To this end, and in accordance with an embodiment of the present disclosure, a signal detection system is disclosed which provides first and second channels. The first channel is configured to provide reduced latency, and the second channel is configured for higher SNR operation. The reduced latency channel applies a lower decimation rate in conjunction with a wider decimation filter. This results in a lower SNR but reduces latency of the samples. Signal detection applications that require reduced latency and that can function with a lower SNR may be fed from this channel. In contrast, the second channel, or high SNR channel, applies a higher decimation rate in conjunction with a narrower decimation filter. This results in a higher SNR but increases delay or latency of the samples. Signal detection applications that require a higher SNR input and that can function with greater latency can be fed from this channel. In some such examples, the reduced latency channel can be employed to provide an early detection threshold that is useful to a detector that processes the later arriving signal delivered from the high SNR channel, as will be explained in greater detail below.

In an example, a signal detection system includes a first processing channel (e.g., a reduced latency channel) configured to down convert a digitized signal to a first baseband signal (e.g., in-phase and quadrature or I/Q samples) at a first decimation rate such that the first baseband signal is provided at a first latency with a first SNR. The first latency and the first SNR are based on the first decimation rate. The system also includes a second processing channel (e.g., a high SNR channel) configured to down convert the digitized signal to a second baseband signal (I/Q samples) at a second decimation rate such that the second baseband signal is provided at a second latency with a second SNR. The second latency and the second SNR are based on the second decimation rate. The second decimation rate is greater than the first decimation rate, such that the second latency is greater than the first latency and the second SNR is greater than the first SNR. The system further includes a detection threshold calculator configured to generate a detection threshold based on the first baseband signal. The detection threshold is generated prior to completion of the generation of the second baseband signal.

It will be appreciated that the techniques described herein may provide detection capability with reduced latency and improved SNR performance, compared to systems that are susceptible to a trade-off that necessitates striking a balance between latency and detection of lower power signals. Numerous embodiments and applications will be apparent in light of this disclosure.

System Architecture

FIG. 1 illustrates a radar system 100 including a detector 140 with reduced latency look-ahead, in accordance with certain embodiments of the present disclosure. The radar system 100 is shown to include an antenna 110 and a receiver 130 comprising a detector with reduced latency look-ahead 140.

The antenna 110 is configured to receive radio frequency (RF) signals and provide those signals $RF_{in}$ 120 to the receiver 130. The receiver 130 is configured to process the $RF_{in}$ signals, for example, using detector 140 which is configured to provide reduced latency look-ahead, as will be explained below. In some embodiments, the signals to be detected may include pulse modulated continuous wave (CW) signals, spread spectrum signals, or other types of signals of interest. The detected signals may then be employed for any suitable purpose. In some embodiments, the detected signals may trigger the transmission of a response within a time frame that meets operational requirements of an application.

Figure 2:
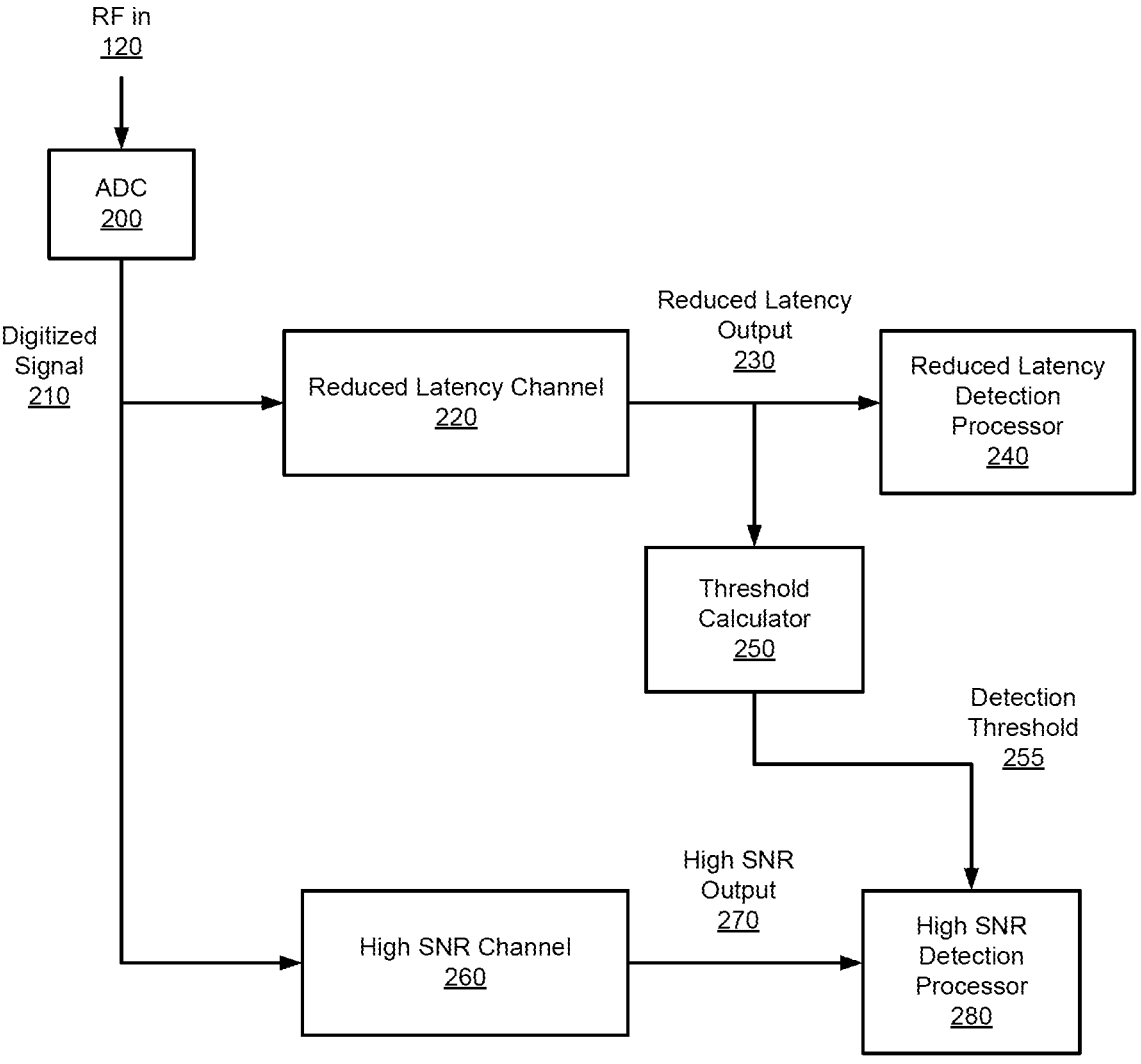
FIG. 2 is a block diagram of the detector with reduced latency look-ahead of FIG. 1, configured in accordance with certain embodiments of the present disclosure.

FIG. 2 is a block diagram of the detector 140 with reduced latency look-ahead of FIG. 1, configured in accordance with certain embodiments of the present disclosure. The detector 140 is shown to include an RF sampling analog to digital converter (ADC) 200, a reduced latency channel 220, a high SNR channel 260, a threshold calculator 250, a reduced latency detection processor 240, and a high SNR detection processor 280.

The RF sampling ADC 200 is configured to sample the $RF_{in}$ signal 120 at a relatively high sampling rate (e.g., RF rates of multiple Gigasamples per second) to produce the digitized signal 210. The digitized signal 210 is then provided to the reduced latency channel 220 and the high SNR channel 260.

Operation of the reduced latency channel 220 and the high SNR channel 260 will be described in greater detail below, but at a high level, the reduced latency channel 220 is configured to down convert the digitized signal 210 to a first baseband signal (e.g., the reduced latency output 230) at a first decimation rate (M) such that the reduced latency output 230 is provided at a first latency with a first SNR. The first latency and the first SNR are based on the first decimation rate.

The high SNR channel 260 is configured to down convert the digitized signal 210 to a second baseband signal (e.g., the high SNR output 270) at a second decimation rate (N) such that the high SNR output 270 is provided at a second latency with a second SNR. The second latency and the second SNR are based on the second decimation rate. The channels 220 and 260 are configured such that the second decimation rate is greater than the first decimation rate (N>M). As such, the second latency is greater than the first latency and the second SNR is greater than the first SNR.

Because the reduced latency channel 220 generates output at a higher sampling rate, due to the lower decimation rate, the output of that channel is provided earlier in time than the output of the high SNR channel 260. For example, if the first decimation rate M is 8 and the second decimation rate N is 16, then the latency of the high SNR channel 260 will be greater than that of the reduced latency channel 220. The SNR on the reduced latency channel is lower, however, because the lower decimation rate results in a wider noise bandwidth compared to the high SNR channel 260. For example, once again, if the first decimation rate M is 8 and the second decimation rate N is 16, then the SNR of the reduced latency channel 220 will be about one half (or 3 dB down) compared to the SNR of the high SNR channel 260.

The threshold calculator 250 is configured to generate a detection threshold 255 based on the reduced latency output 230. In some embodiments, the detection threshold 255 is generated prior to completion of the generation of the high SNR output 270. In this manner, the low latency path provides an early indication of expected characteristics of the signal so that detection thresholds can be optimized for the downstream detector 280 that operates on the High SNR output 270.

For example, in some embodiments, when the digitized signal 210 is a pulse modulated continuous wave signal, the detection threshold 255 may be calculated as proportional to a peak magnitude of the I/Q sample values of the reduced latency output 230. Alternatively, in some embodiments, the detection threshold 255 may be calculated as proportional to an average of the magnitudes of the I/Q sample values of the reduced latency output 230, or as proportional to the RMS value (e.g., envelope) of the I/Q samples of the reduced latency output 230. The detection threshold 255 may then be used by the high SNR detection processor 280 as a threshold to which the high SNR output 270 may be compared to determine the presence of a pulse without incurring additional latency to calculate that threshold value.

In some other embodiments, for example, when the digitized signal 210 is a spread spectrum signal, the detection threshold 255 may be calculated as proportional to a correlation of the reduced latency output 230 with a spreading function. The detection threshold can then be used as an aid to the high SNR detection processor 280. In some other embodiments, determining the threshold ahead of time will result in more efficient implementations in the high SNR detection processor 280.

The reduced latency detection processor 240 is configured to detect a signal of interest in the data provided by the reduced latency channel 220 and the high SNR detection processor 280 is configured to detect a signal of interest in the data provided by the high SNR channel 260. Although the detectors 240 and 280 operate on data provided from different streams (e.g., channels 220 and 260) they may function in the same manner, according to some embodiments. For example, the detectors may be pulse detectors for pulsed CW signals, correlators for spread spectrum signals, or any other type of detector suitable for detecting a signal of interest. The detection processors may be configured to utilize any relevant information about the signal characteristics to make a detection decision. The high SNR detection processor 280 can benefit by receiving some or all of that information ahead of time, from the reduced latency channel 220 by way of the threshold calculator 250.

For example, in the case of pulse detection, the detection threshold may be used to reconstruct the pulse by comparing the signal magnitude to the threshold and setting a digital "one" when the signal magnitude is above the threshold. In the case of correlation based detection, correlation of I/Q samples in the reduced latency path may use the full number of bits available in the signal to generate a correlation detection threshold. The demodulation logic in the high SNR detection processor may then be simplified by using fewer bits for the I/Q correlation in that path based on the correlation detection threshold provided by the reduced latency path.

In some embodiments, for example if the radar system 100 is an identification friend or foe (IFF) system and the digitized signal is an IFF interrogator signal, a relatively high SNR may be needed to detect the minimum required input signal level of an interrogation pulse. However, in this IFF application, it is also necessary to look ahead in time to determine if a subsequent pulse (e.g., an IFF suppression pulse) is present, in order to decide if an IFF response should be transmitted. The reduced latency detection processor 240 may be used to detect the IFF suppression pulse (which may not require as high an SNR) based on the reduced latency output 230, prior to detection of the earlier arriving IFF interrogation pulse processed through the slower high SNR channel 260. The disclosed two channel approach allows the system to meet sensitivity requirements by providing a sufficiently high SNR for detecting the interrogation pulse while simultaneously monitoring the low latency path for the earliest possible indication of the presence of a suppression pulse.

Figure 3:
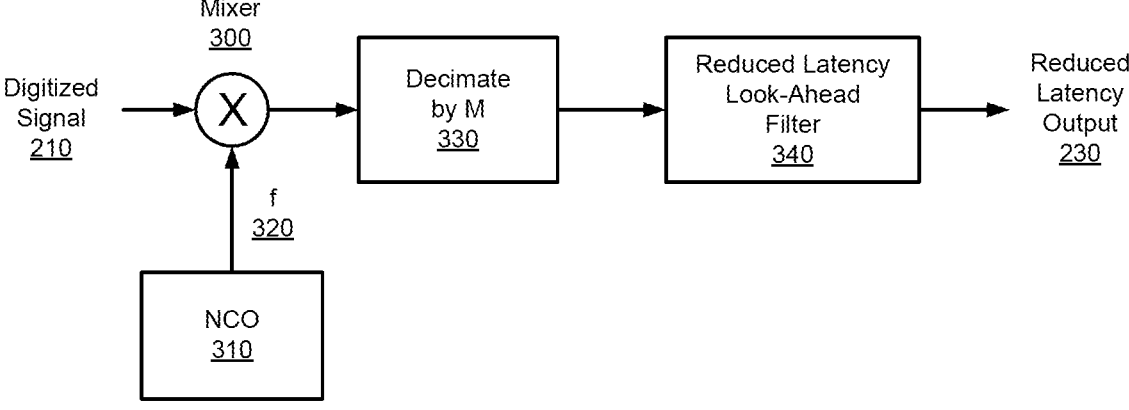
FIG. 3 is a block diagram of the reduced latency channel of the detector of FIG. 2, configured in accordance with certain embodiments of the present disclosure.

FIG. 3 is a block diagram of the reduced latency channel 220 of the detector of FIG. 2, configured in accordance with certain embodiments of the present disclosure. The reduced latency channel 220 is shown to include a mixer 300, a numerically controlled oscillator (NCO) 310, a decimation circuit 330, and a reduced latency look-ahead filter 340.

The NCO 310 is configured to generate a down-conversion frequency signal (e.g., a digital sinusoidal signal) at a frequency f 320. The frequency f is chosen as the frequency offset by which the signal of interest is to be converted to baseband. The mixer 300 is configured to mix the digitized signal 210 with the down-conversion frequency signal at f 320 to generate a mixed signal. The decimation circuit 330 is configured to decimate the mixed signal at the first decimation rate M (e.g., the lower decimation rate). For example, the decimator may select every $M^{th}$ sample and discard the M−1 intermediate samples.

The reduced latency look-ahead filter 340 is a low pass filter configured to filter or otherwise attenuate high frequency noise from the decimated mixed signal to generate the first baseband signal (e.g., the reduced latency output 230). In some embodiments, the low pass filter is an infinite impulse response (IIR) filter which imparts a relatively lower latency than other types of filters such as a finite impulse response (FIR) filter, further contributing to latency reduction for this channel.

Figure 4:
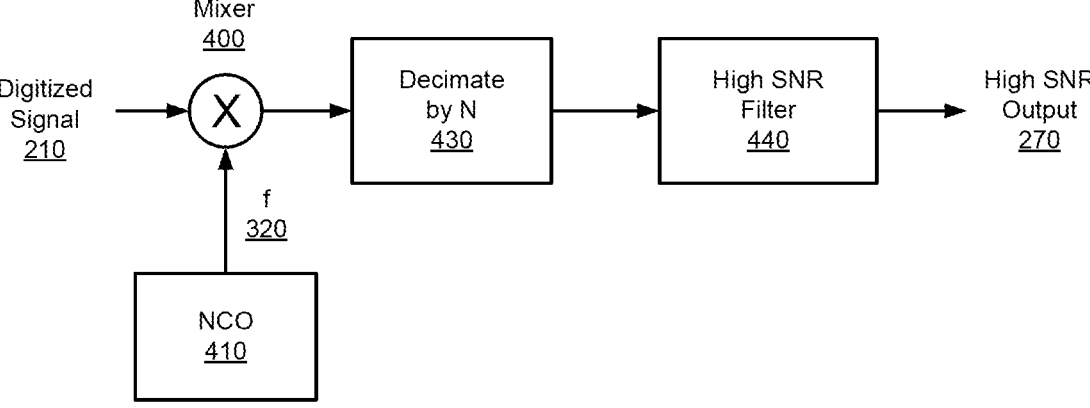
FIG. 4 is a block diagram of the high signal to noise ratio (SNR) channel of the detector of FIG. 2, configured in accordance with certain embodiments of the present disclosure.

FIG. 4 is a block diagram of the high SNR channel 260 of the detector of FIG. 2, configured in accordance with certain embodiments of the present disclosure. The high SNR channel 260 is shown to include a mixer 400, an NCO 410, a decimation circuit 430, and a high SNR filter 440.

The NCO 410 is configured to generate the down-conversion frequency signal (e.g., the digital sinusoidal signal) at frequency f 320. In other words, the high SNR channel 260 is tuned to the same frequency as the reduce latency channel 220. The mixer 400 is configured to mix the digitized signal 210 with the down-conversion frequency signal at f 320 to generate a mixed signal. The decimation circuit 430 is configured to decimate the mixed signal at the second decimation rate N (e.g., the higher decimation rate). For example, the decimator may select every $N^{th}$ sample and discard the N−1 intermediate samples.

The high SNR filter 440 is a low pass filter configured to filter or otherwise attenuate high frequency noise from the decimated mixed signal to generate the second baseband signal (e.g., the high SNR output 270). In some embodiments, the low pass filter is an FIR filter.

In some embodiments, the detector 140 may be implemented as two channels of a multi-channel RF system-on-a-chip (RFSoC).

Methodology

Figure 5:
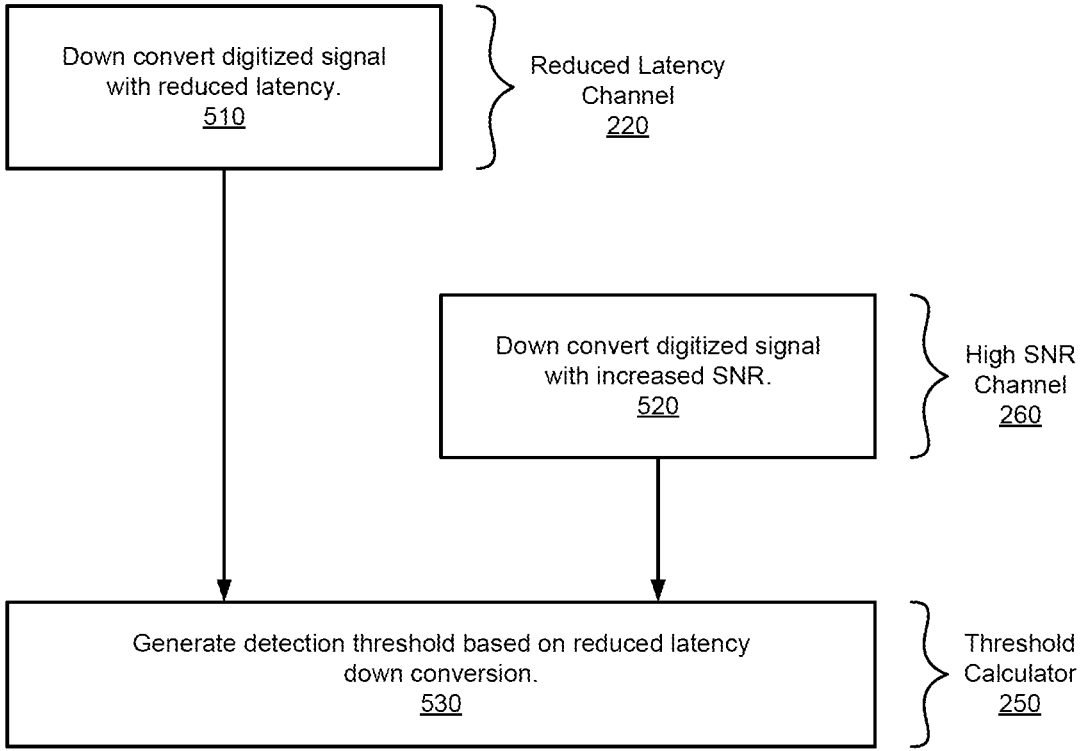
FIG. 5 is a flowchart illustrating a methodology for signal detection based on reduced latency look-ahead, in accordance with an embodiment of the present disclosure.

FIG. 5 is a flowchart illustrating a methodology 500 for signal detection based on reduced latency look-ahead, in accordance with an embodiment of the present disclosure. As can be seen, example method 500 includes a number of phases and sub-processes, the sequence of which may vary from one embodiment to another. However, when considered in aggregate, these phases and sub-processes form a process for operation of signal detection system comprising a low latency channel and a high SNR channel, in accordance with certain of the embodiments disclosed herein, for example as illustrated in FIGS. 1-4, as described above. However other system architectures can be used in other embodiments, as will be apparent in light of this disclosure. To this end, the correlation of the various functions shown in FIG. 5 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 500 commences, at operation 510, by down converting a digitized signal, for example in the reduced latency channel 220, to a first baseband signal (e.g., the reduced latency output 230) at a first decimation rate. The first baseband signal is provided at a first latency with a first SNR which are based on the first decimation rate.

At operation 520, the digitized signal is down converted, for example, in the high SNR channel 260, to a second baseband signal (e.g., the high SNR output 270) at a second decimation rate. The second baseband signal is provided at a second latency with a second SNR which are based on the second decimation rate. In some embodiments, the second decimation rate is greater than the first decimation rate, the second latency is greater than the first latency, and the second SNR is greater than the first SNR.

At operation 530, a detection threshold is generated based on the reduced latency output. Due to the lower latency of the reduced latency output 230, the detection threshold is generated prior to completion of the generation of the high SNR output. In some embodiments, the digitized signal is a pulse modulated CW signal, and the detection threshold is calculated as being proportional to (e.g., X dB down from) a peak magnitude of the I/Q sample values of the reduced latency output 230 or as being proportional to average of the magnitudes of the I/Q sample values of the reduced latency output 230. In some embodiments, the digitized signal is a spread spectrum signal, and the detection threshold is calculated as being proportional to a correlation of the first baseband signal and a spreading function.

In some embodiments, additional operations may be performed, as previously described in connection with the system. For example, the down conversion to generate the reduced latency output 230 may include filtering high frequency noise from the decimated signal using an IIR filter that imparts relatively low latency. In some embodiments, the down conversion to generate the high SNR output may include filtering high frequency noise from the decimated signal using an FIR filter. As will be appreciated, such filtering of high frequency noise can be accomplished, for instance, using a low pass filter configured to attenuate the magnitude of the high frequency noise, such that the noise becomes negligible.

In some embodiments, the reduced latency output 230 may be provided to a detection processing application that requires low latency to achieve timing constraints, such as, for example an IFF suppression pulse detector. In some embodiments, the high SNR output may be provided to a detection processor that requires a high SNR signal to achieve detection performance requirements.

Example System

Figure 6:
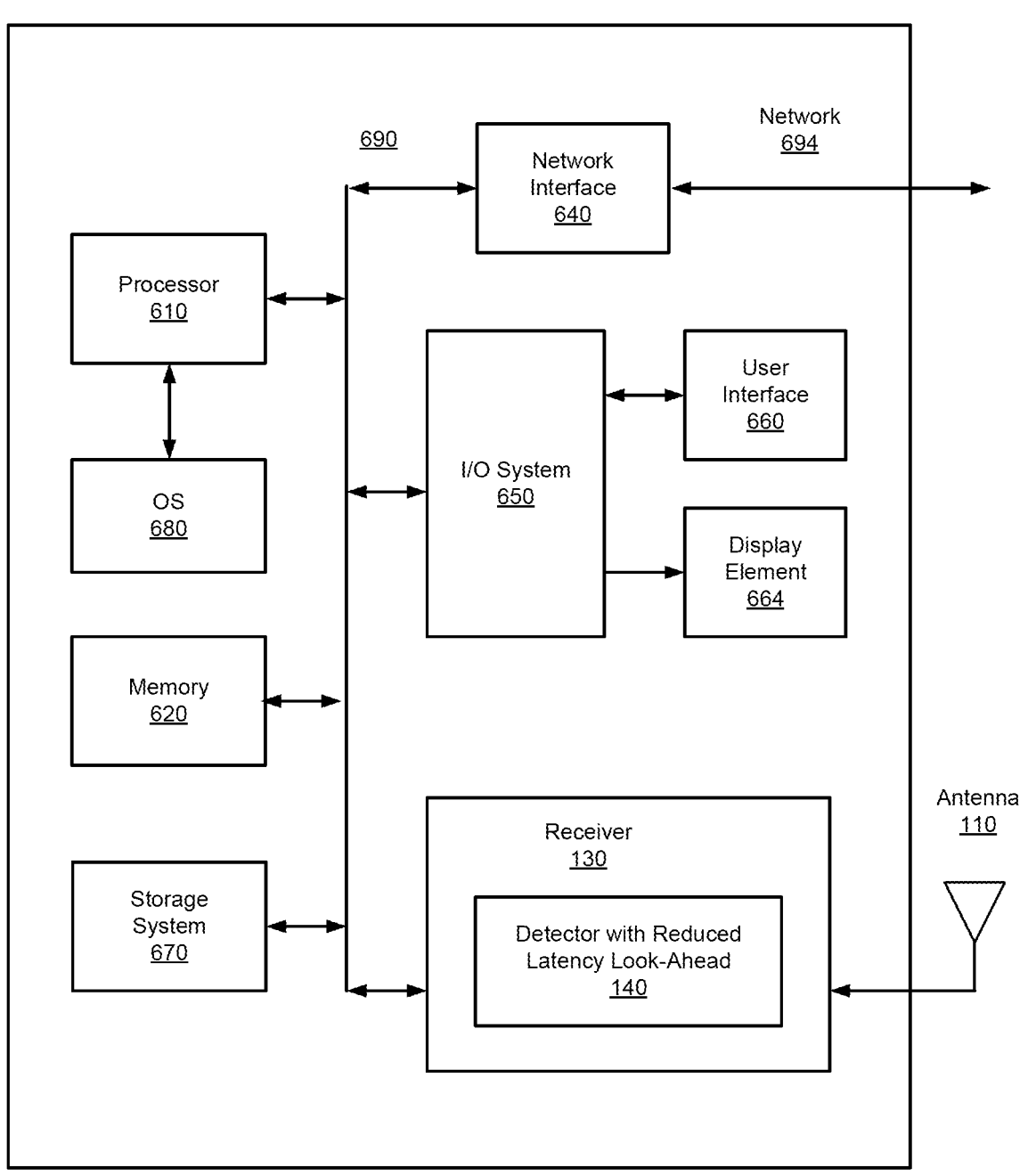
FIG. 6 is a block diagram of a processing platform configured to provide a signal detection system comprising a low latency channel and a high SNR channel, in accordance with an embodiment of the present disclosure.

FIG. 6 is a block diagram of a processing platform 600 configured to provide a signal detection system comprising a low latency channel and a high SNR channel, in accordance with an embodiment of the present disclosure. In some embodiments, platform 600, or portions thereof, may be hosted on, or otherwise be incorporated into the electronic systems of an aircraft, ship, or ground station, including radar systems, IFF transponders, IFF interrogators, communication systems, and the like. The disclosed techniques may be used to provide low latency look-ahead for improved signal detection.

In some embodiments, platform 600 may comprise any combination of a processor 610, memory 620, receiver 130 with detector 140, a network interface 640, an input/output (I/O) system 650, a user interface 660, a display element 664, a storage system 670, and antenna 110. As can be further seen, a bus and/or interconnect 690 is also provided to allow for communication between the various components listed above and/or other components not shown. Platform 600 can be coupled to a network 694 through network interface 640 to allow for communications with other computing devices, platforms, devices to be controlled, or other resources. Other componentry and functionality not reflected in the block diagram of FIG. 6 will be apparent in light of this disclosure, and it will be appreciated that other embodiments are not limited to any particular hardware configuration.

Processor 610 can be any suitable processor, and may include one or more coprocessors or controllers, such as an audio processor, a graphics processing unit, or hardware accelerator, to assist in the execution of mission software and/or any control and processing operations associated with platform 600, including operation of the multi-waveform steering vector computation system 160. In some embodiments, the processor 610 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 610 may be implemented as a complex instruction set computer (CISC) or a reduced instruction set computer (RISC) processor. In some embodiments, processor 610 may be configured as an x86 instruction set compatible processor.

Memory 620 can be implemented using any suitable type of digital storage including, for example, flash memory and/or random access memory (RAM). In some embodiments, the memory 620 may include various layers of memory hierarchy and/or memory caches as are known to those of skill in the art. Memory 620 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 610 may be configured to execute an Operating System (OS) 680 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 600, and therefore may also be implemented using any suitable existing or subsequently developed platform.

Network interface circuit 640 can be any appropriate network chip or chipset which allows for wired and/or wireless connection between other components of platform 600 and/or network 694, thereby enabling platform 600 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of platform 600. I/O devices may include, but not be limited to, user interface 660 and display element 664. User interface 660 may include devices (not shown) such as a touchpad, cockpit display unit, keyboard, and mouse, etc., for example, to allow the user to control the system. Display element 664 may be configured to display information to a user. I/O system 650 may include a graphics subsystem configured to perform processing of images for rendering on the display element 664. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 610 or any chipset of platform 600.

It will be appreciated that in some embodiments, the various components of platform 600 may be combined or integrated in a system-on-a-chip (SoC) architecture. In some embodiments, the components may be hardware components, firmware components, software components or any suitable combination of hardware, firmware, or software.

The detector with reduced latency look-ahead 140 is configured to provide a signal detection system comprising a low latency channel and a high SNR channel, as described previously. The detector with reduced latency look-ahead 140 may include any or all of the circuits/components illustrated in FIGS. 1-4, as described above. These components can be implemented or otherwise used in conjunction with a variety of suitable software and/or hardware that is coupled to or that otherwise forms a part of platform 600. These components can additionally or alternatively be implemented or otherwise used in conjunction with user I/O devices that are capable of providing information to, and receiving information and commands from, a user.

In various embodiments, platform 600 may be implemented as a wireless system, a wired system, or a combination of both. When implemented as a wireless system, platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic. NET, Beginner's All-Purpose Symbolic Instruction Code (BASIC), VHDL, Matlab, Simulink, Verilog, System Verilog, or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a signal detection system comprising: a first processing channel configured to down convert a digitized signal to a first baseband signal at a first decimation rate such that the first baseband signal is provided at a first latency with a first signal to noise ratio (SNR), the first latency and the first SNR based on the first decimation rate; a second processing channel configured to down convert the digitized signal to a second baseband signal at a second decimation rate such that the second baseband signal is provided at a second latency with a second SNR, the second latency and the second SNR based on the second decimation rate, wherein the second decimation rate is greater than the first decimation rate, the second latency is greater than the first latency, and the second SNR is greater than the first SNR; and a detection threshold calculator configured to generate a detection threshold based on the first baseband signal, the detection threshold generated prior to completion of the generation of the second baseband signal.

Example 2 includes the system of Example 1, wherein the first processing channel comprises: a numerically controlled oscillator (NCO) configured to generate a down-conversion frequency signal; a mixer configured to mix the digitized signal with the down-conversion frequency signal to generate a mixed signal; a decimation circuit configured to decimate the mixed signal at the first decimation rate; and a low pass filter configured to attenuate high frequency noise from the decimated mixed signal to generate the first baseband signal.

Example 3 includes the system of Example 2, wherein the low pass filter is an infinite impulse response filter.

Example 4 includes the system of any of Examples 1-3, wherein the second processing channel comprises: a numerically controlled oscillator (NCO) configured to generate a down-conversion frequency signal; a mixer configured to mix the digitized signal with the down-conversion frequency signal to generate a mixed signal; a decimation circuit configured to decimate the mixed signal at the second decimation rate; and a low pass filter configured to attenuate high frequency noise from the decimated mixed signal to generate the second baseband signal.

Example 5 includes the system of Example 4, wherein the low pass filter is a finite impulse response filter.

Example 6 includes the system of any of Examples 1-5, wherein the digitized signal is a pulse modulated continuous wave signal, and the detection threshold is calculated as proportional to a peak sample value of the first baseband signal or as proportional to an average of sample values of the first baseband signal.

Example 7 includes the system of any of Examples 1-6, wherein the digitized signal is a spread spectrum signal, and the detection threshold is calculated as proportional to a correlation of the first baseband signal and a spreading function.

Example 8 includes the system of any of Examples 1-7, wherein the digitized signal is an identification friend or foe (IFF) interrogator signal, and the system comprises a reduced latency detection processor configured to detect an IFF suppression pulse based on the first baseband signal.

Example 9 is a radio frequency (RF) system-on-a-chip (SoC) comprising the signal detection system of claim 1.

Example 10 is a computer program product including one or more non-transitory machine-readable mediums encoded with instructions that when executed by one or more processors cause a process to be carried out for signal detection, the process comprising: down converting a digitized signal to a first baseband signal at a first decimation rate such that the first baseband signal is provided at a first latency with a first signal to noise ratio (SNR), the first latency and the first SNR based on the first decimation rate; down converting the digitized signal to a second baseband signal at a second decimation rate such that the second baseband signal is provided at a second latency with a second SNR, the second latency and the second SNR based on the second decimation rate, wherein the second decimation rate is greater than the first decimation rate, the second latency is greater than the first latency, and the second SNR is greater than the first SNR; and generating a detection threshold based on the first baseband signal, the detection threshold generated prior to completion of the generation of the second baseband signal.

Example 11 includes the computer program product of Example 10, wherein the process comprises: generating a down-conversion frequency signal; mixing the digitized signal with the down-conversion frequency signal to generate a mixed signal; decimating the mixed signal at the first decimation rate to generate a first decimated signal; filtering high frequency noise from the first decimated signal to generate the first baseband signal; decimating the mixed signal at the second decimation rate to generate a second decimated signal; and filtering high frequency noise from the second decimated signal to generate the second baseband signal.

Example 12 includes the computer program product of Examples 10 or 11, wherein the process comprises attenuating, using an infinite impulse response filter, the high frequency noise from the first decimated signal, and attenuating, using a finite impulse response filter, the high frequency noise from the second decimated signal.

Example 13 includes the computer program product of any of Examples 10-12, wherein the digitized signal is a pulse modulated continuous wave signal, and the detection threshold is calculated as proportional to a peak sample value of the first baseband signal or as proportional to an average of sample values of the first baseband signal.

Example 14 includes the computer program product of any of Examples 10-13, wherein the digitized signal is a spread spectrum signal, and the detection threshold is calculated as proportional to a correlation of the first baseband signal and a spreading function.

Example 15 includes the computer program product of any of Examples 10-14, wherein the digitized signal is an identification friend or foe (IFF) interrogator signal, and the process comprises detecting an IFF suppression pulse based on the first baseband signal.

Example 16 is a method for signal detection, the method comprising: down converting, by a processor-based system, a digitized signal to a first baseband signal at a first decimation rate such that the first baseband signal is provided at a first latency with a first signal to noise ratio (SNR), the first latency and the first SNR based on the first decimation rate; down converting, by the-processor based system, the digitized signal to a second baseband signal at a second decimation rate such that the second baseband signal is provided at a second latency with a second SNR, the second latency and the second SNR based on the second decimation rate, wherein the second decimation rate is greater than the first decimation rate, the second latency is greater than the first latency, and the second SNR is greater than the first SNR; and generating, by the processor-based system, a detection threshold based on the first baseband signal, the detection threshold generated prior to completion of the generation of the second baseband signal.

Example 17 includes the method of Example 16, comprising: generating a down-conversion frequency signal; mixing the digitized signal with the down-conversion frequency signal to generate a mixed signal; decimating the mixed signal at the first decimation rate to generate a first decimated signal; filtering high frequency noise from the first decimated signal to generate the first baseband signal; decimating the mixed signal at the second decimation rate to generate a second decimated signal; and filtering high frequency noise from the second decimated signal to generate the second baseband signal.

Example 18 includes the method of Examples 16 or 17, comprising attenuating, using an infinite impulse response filter, the high frequency noise from the first decimated signal, and attenuating, using a finite impulse response filter, the high frequency noise from the second decimated signal.

Example 19 includes the method of any of Examples 16-18, wherein the digitized signal is a pulse modulated continuous wave signal, and the detection threshold is calculated as proportional to a peak sample value of the first baseband signal or as proportional to an average of sample values of the first baseband signal.

Example 20 includes the method of any of Examples 16-19, wherein the digitized signal is a spread spectrum signal, and the detection threshold is calculated as proportional to a correlation of the first baseband signal and a spreading function.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A signal detection system comprising:
   a first processing channel configured to down convert a digitized signal to a first baseband signal at a first decimation rate such that the first baseband signal is provided at a first latency with a first signal to noise ratio (SNR), the first latency and the first SNR based on the first decimation rate;
   a second processing channel configured to down convert the digitized signal to a second baseband signal at a second decimation rate such that the second baseband signal is provided at a second latency with a second SNR, the second latency and the second SNR based on the second decimation rate, wherein the second decimation rate is greater than the first decimation rate, the second latency is greater than the first latency, and the second SNR is greater than the first SNR; and
   a detection threshold calculator configured to generate a detection threshold based on the first baseband signal, the detection threshold generated prior to completion of the generation of the second baseband signal.

2. The system of claim 1, wherein the first processing channel comprises:
   a numerically controlled oscillator (NCO) configured to generate a down-conversion frequency signal;
   a mixer configured to mix the digitized signal with the down-conversion frequency signal to generate a mixed signal;
   a decimation circuit configured to decimate the mixed signal at the first decimation rate; and
   a low pass filter configured to attenuate high frequency noise from the decimated mixed signal to generate the first baseband signal.

3. The system of claim 2, wherein the low pass filter is an infinite impulse response filter.

4. The system of claim 1, wherein the second processing channel comprises:

a numerically controlled oscillator (NCO) configured to generate a down-conversion frequency signal;

a mixer configured to mix the digitized signal with the down-conversion frequency signal to generate a mixed signal;

a decimation circuit configured to decimate the mixed signal at the second decimation rate; and a low pass filter configured to attenuate high frequency noise from the decimated mixed signal to generate the second baseband signal.

5. The system of claim 4, wherein the low pass filter is a finite impulse response filter.

6. A radio frequency (RF) system-on-a-chip (SoC) comprising the signal detection system of claim 1.

7. A computer program product including one or more non-transitory machine-readable mediums encoded with instructions that when executed by one or more processors cause a process to be carried out for signal detection, the process comprising:

down converting a digitized signal to a first baseband signal at a first decimation rate such that the first baseband signal is provided at a first latency with a first signal to noise ratio (SNR), the first latency and the first SNR based on the first decimation rate;

down converting the digitized signal to a second baseband signal at a second decimation rate such that the second baseband signal is provided at a second latency with a second SNR, the second latency and the second SNR based on the second decimation rate, wherein the second decimation rate is greater than the first decimation rate, the second latency is greater than the first latency, and the second SNR is greater than the first SNR; and generating a detection threshold based on the first baseband signal, the detection threshold generated prior to completion of the generation of the second baseband signal.

8. The computer program product of claim 7, wherein the process further comprises:

generating a down-conversion frequency signal;

mixing the digitized signal with the down-conversion frequency signal to generate a mixed signal;

decimating the mixed signal at the first decimation rate to generate a first decimated signal;

filtering high frequency noise from the first decimated signal to generate the first baseband signal;

decimating the mixed signal at the second decimation rate to generate a second decimated signal; and filtering high frequency noise from the second decimated signal to generate the second baseband signal.

9. The computer program product of claim 7, wherein the process further comprises attenuating, using an infinite impulse response filter, a high frequency noise from the first decimated signal, and attenuating, using a finite impulse response filter, the high frequency noise from a second decimated signal.

10. The computer program product of claim 7, wherein the digitized signal is a pulse modulated continuous wave signal, and the detection threshold is calculated as proportional to a peak sample value of the first baseband signal or as proportional to an average of sample values of the first baseband signal.

11. The computer program product of claim 7, wherein the digitized signal is a spread spectrum signal, and the detection threshold is calculated as proportional to a correlation of the first baseband signal and a spreading function.

12. The computer program product of claim 7, wherein the digitized signal is an identification friend or foe (IFF) interrogator signal, and the process comprises detecting an IFF suppression pulse based on the first baseband signal.

13. A method for signal detection, the method comprising:

down converting, by a processor-based system, a digitized signal to a first baseband signal at a first decimation rate such that the first baseband signal is provided at a first latency with a first signal to noise ratio (SNR), the first latency and the first SNR based on the first decimation rate;

down converting, by the-processor based system, the digitized signal to a second baseband signal at a second decimation rate such that the second baseband signal is provided at a second latency with a second SNR, the second latency and the second SNR based on the second decimation rate, wherein the second decimation rate is greater than the first decimation rate, the second latency is greater than the first latency, and the second SNR is greater than the first SNR; and generating, by the processor-based system, a detection threshold based on the first baseband signal, the detection threshold generated prior to completion of the generation of the second baseband signal.

14. The method of claim 13, further comprising:

generating a down-conversion frequency signal;

mixing the digitized signal with the down-conversion frequency signal to generate a mixed signal;

decimating the mixed signal at the first decimation rate to generate a first decimated signal;

filtering high frequency noise from the first decimated signal to generate the first baseband signal;

decimating the mixed signal at the second decimation rate to generate a second decimated signal; and filtering high frequency noise from the second decimated signal to generate the second baseband signal.

15. The method of claim 13, further comprising attenuating, using an infinite impulse response filter, a high frequency noise from the first decimated signal, and attenuating, using a finite impulse response filter, a high frequency noise from the second decimated signal.

16. The method of claim 13, wherein the digitized signal is a pulse modulated continuous wave signal, and the detection threshold is calculated as proportional to a peak sample value of the first baseband signal or as proportional to an average of sample values of the first baseband signal.

17. The method of claim 13, wherein the digitized signal is a spread spectrum signal, and the detection threshold is calculated as proportional to a correlation of the first baseband signal and a spreading function.

* * * * *